(12) United States Patent
Schoenenberger et al.

(10) Patent No.: US 7,978,415 B2
(45) Date of Patent: Jul. 12, 2011

(54) OBSERVATION DEVICE

(75) Inventors: Bernhard Schoenenberger, Rebstein (CH); Richard A. Leblanc, Clermont, FL (US); Felix Waelti, Marbach (CH); Patrick Drach, Thal (CH); Marcel Zeller, Balgach (CH)

(73) Assignee: Vectronix AG, Heerbrugg (CH)

( * ) Notice: Subject to any disclaimer, the term of this patent is extended or adjusted under 35 U.S.C. 154(b) by 0 days.

(21) Appl. No.: 12/488,811

(22) Filed: Jun. 22, 2009

(65) Prior Publication Data

US 2010/0014166 A1 Jan. 21, 2010

(30) Foreign Application Priority Data

Jun. 23, 2008 (EP) .................................... 08104502

(51) Int. Cl.
G02B 27/14 (2006.01)
G09G 5/00 (2006.01)
(52) U.S. Cl. ................................ 359/630; 345/7; 345/9
(58) Field of Classification Search .................. 345/7, 8, 345/9; 348/143; 349/11; 359/630, 633
See application file for complete search history.

(56) References Cited

U.S. PATENT DOCUMENTS

| 4,000,419 | A | 12/1976 | Crost et al. |
| 5,129,309 | A | 7/1992 | Lecuyer |
| 7,158,296 | B1 * | 1/2007 | Schwartz et al. ............. 359/407 |
| 7,483,208 | B2 * | 1/2009 | Zadravec ...................... 359/407 |
| 2006/0164724 | A1 * | 7/2006 | Nagata et al. ................. 359/399 |
| 2007/0273968 | A1 | 11/2007 | Drodofsky et al. |

FOREIGN PATENT DOCUMENTS

| CA | 2670169 A1 * 12/2009 |
| EP | 1 028 343 A   8/2000 |
| EP | 1 686 409 A   8/2006 |
| EP | 2138885 A1 * 12/2009 |
| WO | WO 2006/018212 A   2/2006 |

* cited by examiner

*Primary Examiner* — David N Spector
(74) *Attorney, Agent, or Firm* — Muncy, Geissler, Olds & Lowe, PLLC (57) ABSTRACT

An observation device includes at least one day vision channel, an information channel with a graphic electronic display for producing a display image and a combination optical system for combining the day vision channel and the information channel, so that a combined overall image forms.

13 Claims, 7 Drawing Sheets

Fig. 1

PRIOR ART

OBSERVATION DEVICE

The present application claims priority to European Patent Application No. 08104502.3, which was filed in the EPO on Jun. 23, 2008, and which is herein incorporated by reference.

BACKGROUND

The invention relates to an observation device comprising an electronic display for providing additional information.

Efficient observation devices are used in particular for military and geodetic purposes. It is important that the devices be manageable, fast and easy to operate and as compact and light as possible. While it was previously usual to use a plurality of devices for different purposes, combined, multifunctional devices are preferably used today. This is advantageous from many points of view; for example, carrying a plurality of devices becomes superfluous and substantially faster change between the functions is permitted.

For example, in addition to the day observation function, such devices may have the following further functions: target plates for military applications or for hunting purposes, integrated rangefinders and direction indicators, an electronic display for providing additional information (in particular where a display image can be superposed with the day vision image), a night vision function, etc. Thus, it is possible, for example, to provide the user with an image of a camera, location information, for example in the form of a map, measured distances or directions, stored information regarding a sighted target object—such as, for example, susceptible points of an enemy tank—or temperature and weather information on the basis of the electronic display. In particular, these devices are often in the form of binoculars or field glasses having said special functions for respective specific intended uses.

For a device with both day vision and display image function, a design having two separate channels—a day vision channel and an information channel—is generally customary. The day vision channel is generally formed in the manner of a known telescope comprising objective and optically refractive and reflective elements. The information channel usually has an electronic indicator/display and a downstream display optical system. For example, a liquid crystal display (LCD), a display comprising organic or inorganic light emitting diodes (OLED or LED display), a relatively highly luminous high-contrast liquid crystal on silicon display (LCoS display), a digital micromirror display (DMD), etc. can be used as a display for this purpose. In particular, beam splitters are used for combining the day vision and the information channel or for superposing the day vision image with the display image. The resulting combined overall image can then be projected via an eyepiece into the eye of an observer.

For the use of such observation devices in the field, in particular a low energy consumption, a high level of compactness and a low weight of the device must be ensured. Thus, the maximum operating time of field glasses having a display function may be from a few hours to several days, depending on the battery or accumulator power provided.

In order to ensure a low energy consumption, in particular the use of energy-saving displays is advantageous.

However, a factor preventing the use of such energy-saving displays is that they also have a relatively low brightness and a relatively low contrast. Particularly when the display image is superposed with the day vision image, the additional information often cannot be clearly and distinctly recognized but—if at all—only with difficulty.

Various approaches have been known to date for solving this conflict of aims, namely combining additional information displayed as clearly and distinctly as possible with a day vision image and having as low an energy consumption as possible thereby.

For example, two different displays arranged side by side in the display channel can be used, one of the two producing a very bright image and the other a less bright image. Thus, for example, information in text form can be shown with the bright and high-contrast display—which however also has a high energy consumption—and on the other hand information which requires a relatively low contrast compared with the day vision image for clear recognizability can be inserted by means of the energy-saving display.

However, a disadvantage of this solution is the expensive and complicated installation of two different displays and that—in the case of display of information with the brighter display—a relatively large amount of energy is required, this in turn leading to a short duration of operation and/or requiring the use of large and heavy batteries or accumulators.

SUMMARY OF THE INVENTION

It is therefore an object of the present invention to provide an observation device comprising an electronic display for inserting additional information, the display having a relatively low energy consumption and it nevertheless being possible to provide a clear and distinct overall image comprising day vision and display image, in particular the optical complexity of the observation device being kept low.

This object is achieved by realizing the characterizing features of the independent claims. Features which further develop the invention in an alternative or advantageous manner are described in the depending patent claims.

For providing an observation device where the conflict of aims is solved in an improved manner, namely combining additional information which is as clear and distinct as possible with a day vision image and thereby having an energy consumption which is as low as possible, according to the invention a display of a combined overall image comprising day vision image and display image is permitted, which overall image has two part-regions separated from one another. For this purpose, a combination optical system having two zones and intended for combining day vision channel and information channel—in which optical system the electronic display having a relatively low energy consumption is arranged—is provided, the combination of the two channels being effected differently by the two zones.

The image from the day vision channel—or at least a major part of the day vision image—can be superposed with a first part of the display image by the first zone of the combination optical system, which is formed for producing the day vision display region of the overall image. In addition, exclusively a day vision image can be provided by the first zone—for example when the display is switched off.

On the other hand, exclusively a second part of the display image is provided in the pure display region of the overall image by the second zone of the combination optical system. In this region—the exclusive display region—no superposition with the generally very bright day vision image is effected, so that a distinct representation of the information provided in the second part of the display image is permitted.

As a result, an overall image divided into two part-regions is produced, in particular a superposition image from display channel and information channel being shown in the first part-region—namely the superposition region or day vision display region—and on the other hand exclusively a part of the display image being shown in the second part-region—the pure display region. Preferably, all optical systems of the observation device—in particular the combination optical system and an optionally provided reticule plate for providing azimuthal and/or elevation angle—are arranged and formed in such a way that a sharp boundary is present between the day vision display region and the exclusive display region, i.e. that a sharp transition from the first part-region to the second part-region of the combined overall image is produced.

In spite of the use of a relatively low-power and hence energy-saving display, it is now possible according to the invention to show information—such as, for example, text—with sufficiently high contrast and hence clearly and distinctly in the second part-region of the overall image. This is ensured by virtue of the fact that no day vision image substantially exceeding the display image in brightness is superposed in this information part-region of the combined overall image.

Nevertheless, it is also possible—if required—to insert information in the first part-region into the day vision image provided there, in particular information of a type which can easily be seen even in the case of lower contrast.

According to the invention—for example in the case of darkness or a closed day vision channel—the display image can in addition be cohesively provided over the total indication region, so that the cohesive total display image is projected into the eye of an observer as the combined overall image. This mode can be used in particular for displaying a map or for providing a thermal image or a night vision image. For this purpose, a further channel—for example a night vision channel having, for example, an infrared light sensor and low-light-level amplifier, or a thermal image channel with thermal imaging camera—via which radiation from the environment—e.g. heat radiation, infrared radiation or residual light—is detected or shown by the display can be provided on the observation device—as sufficiently well known according to the prior art.

Furthermore, superposition of the day vision image with a thermal image or night vision image shown by means of the display can also be provided according to the invention in the superposition region of the overall image. However, when producing such a superposition image—for example during twilight—it should be ensured that the superposed images can be balanced in their imaging properties. Thus, for example, additional optical components—such as magnifying lenses—can be provided for matching a compensation of sized ratios of the display image and of the day vision image. In this embodiment, it is possible for the observer to view fused images in the superposition region of the overall image, such as, for example, a superposed day image and thermal image. In addition, clearly recognizable text information can be inserted by the second part of the display image, which is shown in the pure display region of the overall image.

For the combination, according to the invention, of day vision channel and information image—so that the overall image is divided into two regions (day vision display region and exclusive display region)—the combination optical system has in particular two zones, the day vision display region being produced by the first zone and the pure display region being produced by the second zone.

For example, the second zone of the combination optical system can be formed and arranged in such a way that radiation information incident on this second zone from the day vision channel is prevented from entering the indication channel, which follows the combination optical system and has, for example, an eyepiece. In particular, the radiation incident within this zone from the day vision channel is caused to bypass the indication channel for this purpose.

According to the invention, the combination optical system can be formed, for example, as a beam splitter prism having a combination surface arranged between day vision channel and information channel.

According to a first embodiment of the beam splitter prism according to the invention, the combination surface may have a part-surface forming the first zone and having a coating which is partly transparent or partly reflective—for example for a specified wavelength range. That remaining part of the combination surface which forms the second zone may be, for example, transmittive or completely reflective—depending on the manner on which the channels are combined—so that radiation information incident there from the information channel is completely guided into the indication channel and radiation information incident from the day vision channel is not guided into the indication channel or is caused to bypass the indication channel.

Alternatively, the combination optical system may be formed in such a way that the first zone extends over the total cross-section of the day vision channel but not over the total cross-section of the information channel but only over a part of the information channel which is intended for superposition. The remaining region of the information channel cross-section is on the other hand filled by the second zone of the combination optical system, radiation incident on the second zone from the information channel preferably being transmitted or guided directly into the indication channel.

For example, a beam splitter prism having a beam splitter surface extending over the total cross-section of the day vision channel and having a partly transparent coating can be used for this purpose, but the beam splitter surface does not extend over the total cross-section of the display channel but only over a part intended for superposition with the day vision image. In the region of the remaining cross-section of the information channel, for example, an extension of the prism is arranged as a second zone of the combination optical system, the prism having no splitter surface in this zone, so that this second zone is formed so as to be completely transparent to radiation from the information channel.

If the observation device has a reticule plate for providing azimuthal and/or elevation angles in the overall image, in general these lines are focused by the human eye of an observer. For producing a sharp boundary between the two part-regions of the overall image, the reticule plate is therefore preferably positioned in a channel cross-sectional plane as close as possible to the boundary edge between first and second zone of the combination optical system. Specifically, the line pattern may also be arranged—for example etched—directly on the combination optical system. As a result, a substantially sharp image of the boundary edge between the two part-regions in the overall image is produced on focusing of the line pattern.

As is sufficiently well known according to the prior art, an eyepiece unit via which the combined overall image produced can be projected into the eye of the user is generally provided in the observation device. The eyepiece unit may be composed of a plurality of optical element, such as convex and concave lenses. In an embodiment of the device according to the invention, the light emanating from objects is collected in the day vision channel in particular via a plurality of objective lenses, conducted by means of optical components, such as prism elements, plane-parallel plates, etc., to the combination optical system and guided by means of the first zone of the combination optical system into the indication channel or to the eyepiece, where it is available as a day vision image.

The observation device according to the invention is formed in particular as a hand-held monocular telescope or binocular field glasses.

In addition, further customary components of the generic type—for example a laser rangefinder for measuring the distance to a sighted target, a digital compass, a tilt meter or an additional illuminator, such as an infrared illuminator—can be integrated into the observation device. For inserting externally stored or generated image information, wireless connections or cable connections to the observation device can be provided so that the external image data can be transmitted to the device and provided to the user by the integrated display.

BRIEF DESCRIPTION OF THE DRAWINGS

The method according to the invention and the device according to the invention are described in more detail below, purely by way of example, with reference to specific working examples shown schematically in the drawings, further advantages of the invention also being discussed. Specifically.

DETAILED DESCRIPTION

Figure 1:
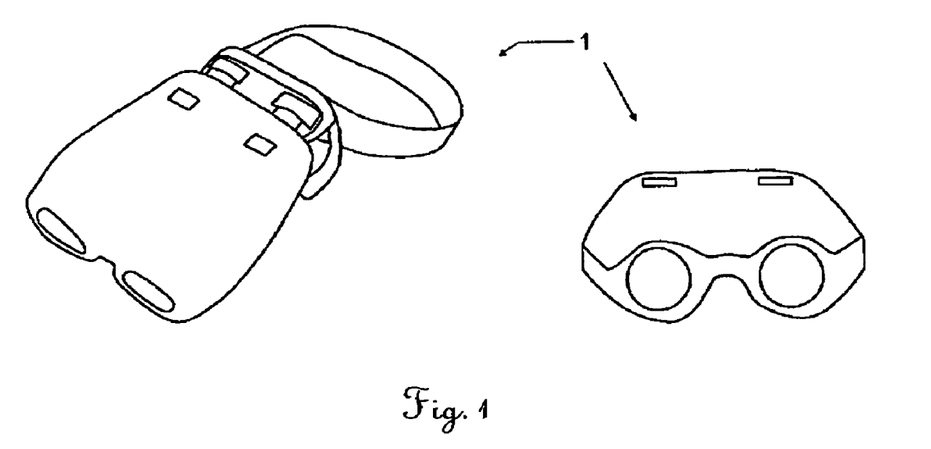
FIG. 1 shows an observation device in the form of binocular field glasses.

FIG. 1 shows an external view of binocular field glasses 1 of the generic type. As is known from the prior art, the field glasses 1 have a compact housing and are therefore suitable for use in the field.

In particular, in addition to the day vision observation function, the field glasses 1 may have further functions, for example a laser rangefinder, a tilt meter, an electronic compass, an altimeter, a barometer, a night vision function and—in a device relating to the invention—an electronic display for inserting additional information.

Figure 2:
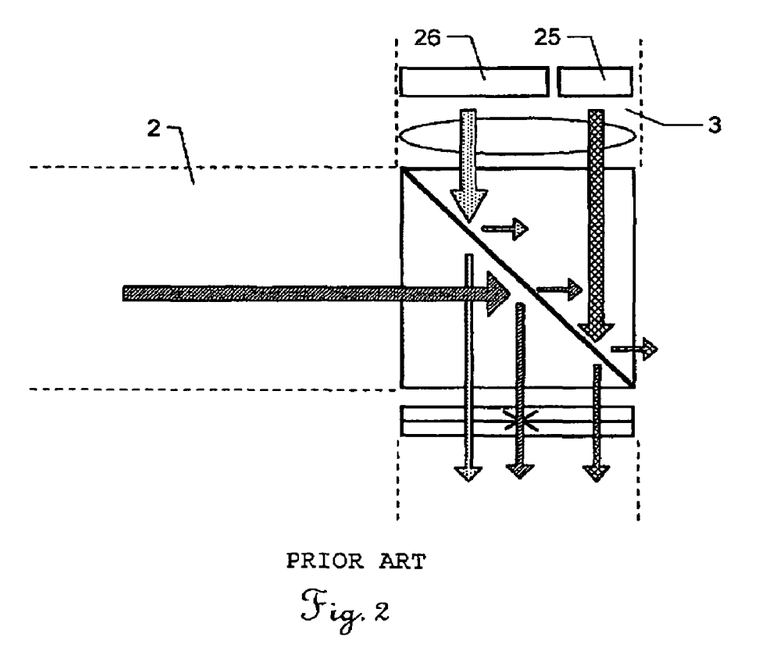
FIG. 2 shows a combination of day vision channel and display channel with two displays according to the prior art.

FIG. 2 shows an approach, known according to the prior art, for solving the conflict of aims, where, for clear and distinct insertion of additional information into a day vision image, a sufficiently bright and high-contrast display image with the additional information is to be provided but at the same time—for permitting as compact and light a device as possible with long operating times—the energy consumption of the display used is to be kept as low as possible.

For this purpose, the solution according to the prior art, shown in FIG. 2, has two separate displays 25, 26 in the information channel 3. A first display 25, which may provide a bright image but has a relatively high energy consumption, is provided for inserting finely structure information, such as, for example, text, which requires a high contrast to the day vision image and hence very great brightness for clear recognizability. For example, a display comprising highly aluminous LEDs can be used for this purpose.

On the other hand, coarse-structured information which is also readily recognizable in the case of lower contrast relative to the day vision image is inserted by means of the second display 26 present—which has a low energy consumption but also lower brightness. For example, an OLED display (i.e. a display comprising organic light omitting diodes) can be used for this purpose. As a result, the first, bright display 25 has to be switched on only for inserting highly resolved, finely structured information into the day vision image and the second, energy-saving display 26 is used in the case of other information insertions, with the result that a lower average energy consumption can be achieved compared with the solution which has exclusively the bright display 25.

The combination of the information channel having the two displays 25, 26 with the day vision channel is effected on the basis of a beam splitter having a coated half-silvered splitter surface.

Since, with the frequent provision of, for example, text information, however, the frequent use of the bright display having the high energy consumption is nevertheless required in the embodiment shown in FIG. 2, having two different displays, no advantages over a solution comprising a single display which has high brightness can be achieved thereby. In this case, therefore, either only relatively short operating times can be achieved or use of relatively heavy and large batteries or accumulators is required.

Figure 3:
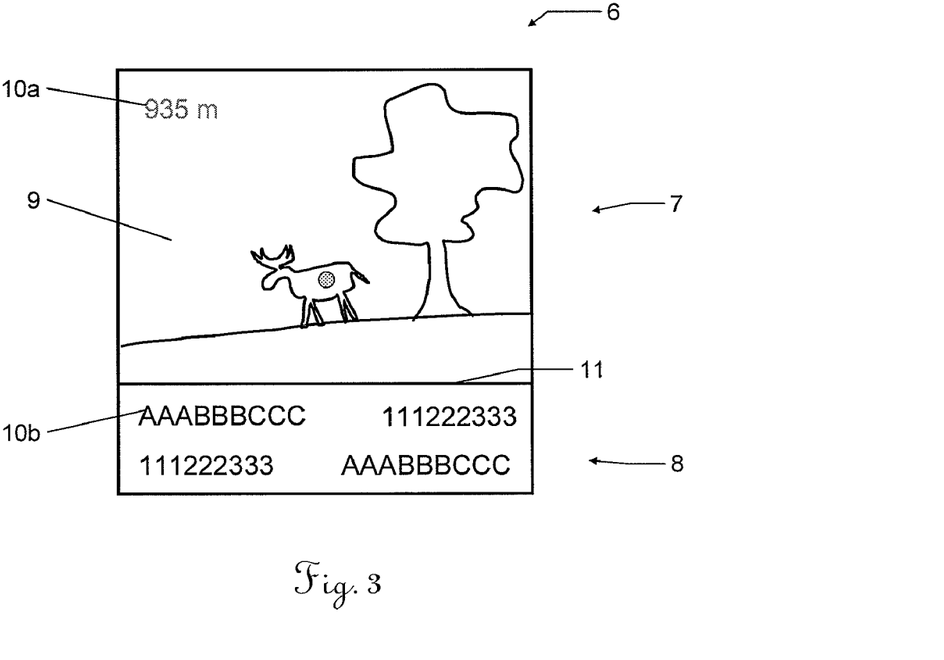
FIG. 3 shows the division, according to the invention, of the provided overall image into superposition region and display region.

FIG. 3 shows a division, according to the invention, of the combined overall image 6 provided by the observation device and comprising day vision image 9 and display image 10a, 10b. The combined overall image 6 is divided into two regions 7, 8. One of the two regions 7—in general the region of larger area—is formed for displaying a superposition of day vision image 9 and a part of the display image 10a provided for insertion into the day vision image 9. A second region 8 of the combined overall image 6—in particular sharply separated from the first region—is on the other hand formed for exclusive display of a second part of the display image 10b, the second region 8 being intended for providing finely structure information—such as text information.

Since, according to the invention, there is no superposition with the day vision image 9—generally far exceeding the brightness of the display image and hence making finely structured display image information unclear—in the second region 8, clear and distinct provision of finely structured display image information can be effected in this region 8 intended exclusively for the display of a part of the display image, even with the use of a single energy-saving display.

According to the invention, an observation device is therefore provided which, with the use of a—in particular single—energy-saving electronic display, provides the user with a combined overall image 6 which both has a day vision display region 7 accounting, for example, for approximately 80% of the overall image 6 and comprising the day vision image 9 and additional information which can be inserted therein and— simultaneously and especially below the day vision display region 7—has an information region or pure display region 8 which, in said example, represents about 20% of the overall image 6. In particular, the production of the two regions separated from one another is effected in such a way that a sharp boundary 11 between day vision display region 7 and exclusive display region 8 forms.

As a result, it is now possible to provide an observation device with clear and distinct information insertion with nevertheless low energy consumption, with the result that both use of light energy suppliers having small dimensions and long operating times can be achieved.

Furthermore, it is made possible according to the invention—for example in the case of a closed day vision channel or at night—also to display exclusively the total display image 10a, 10b over the total region of the combined overall image 6. This mode is suitable in particular for displaying a thermal image or night vision image, a map, a video, etc.

According to the invention, it is also possible to produce a mode in which exclusively the day vision image 9 is displayed in the superposition region 7 (the day vision display region) of the combined overall image 6, it being possible to insert additional information parallel therewith in the exclusive display region 8. For this purpose, that part of the display 10a which is intended for superposition can remain dark and that part of the display 10b which is mapped in the pure display region 8 of the combined overall image 6 can provide the additional information.

Figure 4A:
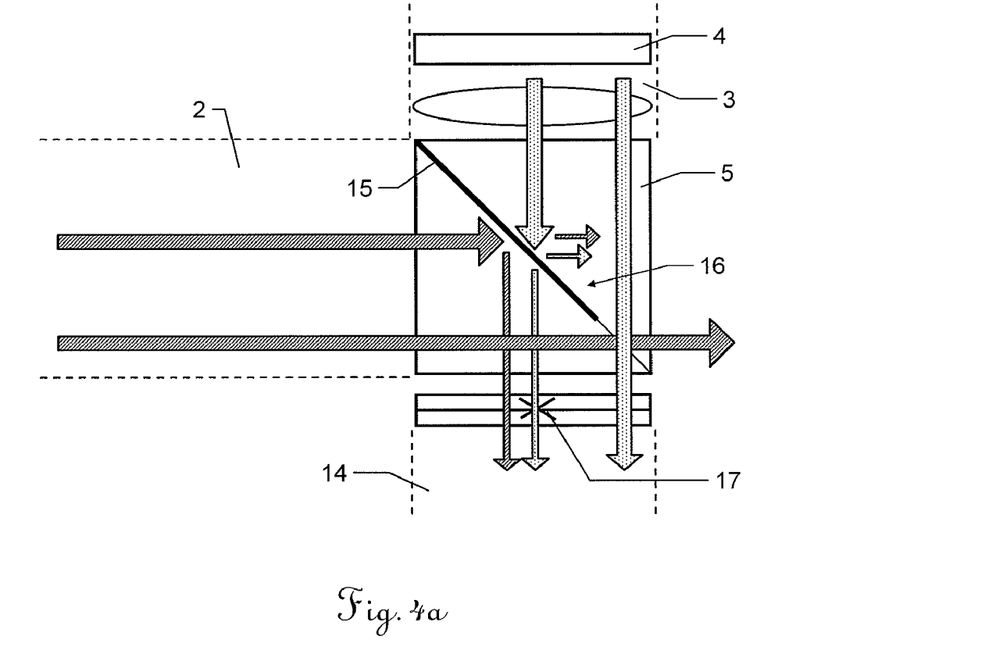
FIG. 4a shows an embodiment, according to the invention, of the combination optical system with beam splitter surface, a partly transparent coating being applied only to a part of the beam splitter surface which forms the first zone.

FIG. 4a shows a first embodiment according to the invention for producing the combined overall image comprising day vision display region and exclusive display region.

For this purpose, the observation device has a day vision channel 2 and an information channel 3 with a single energy-saving graphic display 4—with downstream display optical system—for producing a display image.

For combining the day vision channel 2 and the information channel 3, a combination optical system 5 is provided between day vision channel 2 and information channel 3.

According to the invention, the combination optical system 5 has a first zone for superposing at least a part of the day vision image with a first part of the display image and a second zone for exclusive provision of a second part of the display image. As a result, the division, according to the invention, of the combined overall image into the day vision display region (or superposition region)—produced by the first zone—and the exclusive display region separated from this region—and produced by the second zone of the combination optical system—is achieved.

As shown in FIG. 4a, the combination optical system 5 can be formed for this purpose as a beam splitter prism with a beam splitter surface 16 which extends over the total beam cross-section of the day vision and information channel and is divided into two different part-regions.

A first part-region of the beam splitter surface 16—which forms the first zone of the combination optical system 5—has a partly transparent coating 15, so that radiation incident in this region—both from the day vision channel 2 and from the information channel 3—is guided in each case partly and optionally with superposition into the indication channel 14.

A second part-region of the beam splitter surface 16—which forms the second zone of the combination optical system—is, for example, not coated, so that radiation incident form the information channel 3 is guided—in particular undeflected and completely—into the indication channel 14. Radiation incident on this part-region from the day vision channel 2 is transmitted, likewise undeflected and in particular completely, so that it is not guided into the indication channel 14 or caused to bypass the indication channel 14. In addition, the day vision channel radiation caused to bypass the indication channel 14 by the second zone can, for example, be absorbed by an absorber material so that said radiation is not reflected or scattered by radiation guide walls. As a result, reflected or scattered components of the day vision channel radiation caused to bypass the indication channel 14 according to the invention can be prevented from entering the indication channel to cause interference. According to a further embodiment, a brightness sensor can additionally be arranged after the combination optical system in such a way that the brightness of the day vision channel radiation caused to bypass the indication channel by the second zone can be measured.

In an alternative manner of combination of information channel and day vision channel 3, 2 to give the indication channel 14, the second zone of the combination optical system can also be formed so as to be totally reflective instead of transmittive, so that once again radiation incident there from the information channel 2 is guided completely into the indication channel 14 and radiation incident there from the day vision channel 2 is not guided into the indication channel 14.

As is known according to the prior art, a reticule plate 17 can be arranged downstream of the beam splitter prism, by means of which reticule plate a line pattern is produced in the combined overall image and thus information regarding azimuthal and/or elevation angle can be provided.

Figure 4B:
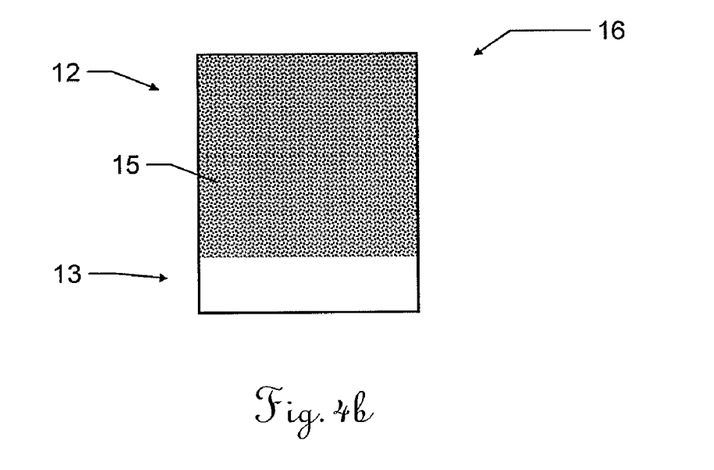
FIG. 4b shows the beam splitter surface of the combination optical system from FIG. 4a, which beam splitter surface is coated only in an upper part-region.

FIG. 4b shows a plan view of the beam splitter surface 16 provided in the beam splitter prism from FIG. 4a. The first region 12 which is shown as a dotted line and—as already described—forms the first zone of the beam splitter prism 16 has the partly transparent coating 15—in particular with specified transmission and reflection ratio—whereas the lower region 13 of the beam splitter surface is formed to be transmittive and, for example, is not coated. For example, the partly transparent coating 15 can be applied by vapor deposition only to the upper part 12 of the surface 16.

Figure 5:
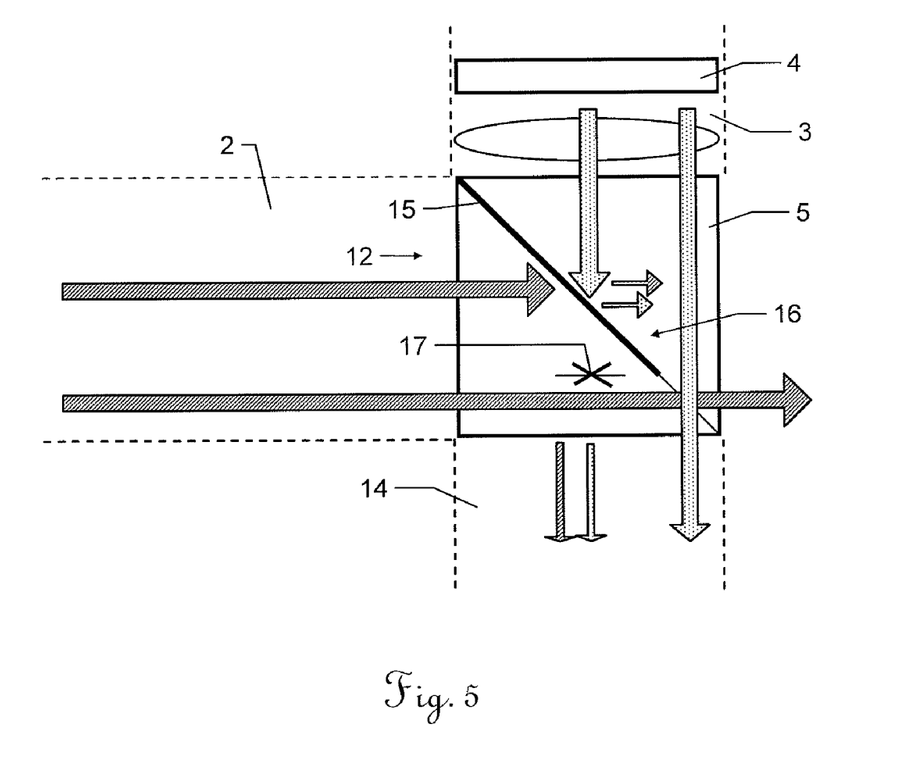
FIG. 5 shows a further embodiment according to the invention of the combination optical system with engraved line pattern.

FIG. 5 shows the combination optical system 5 from FIG. 4a, here the reticule plate not being arranged after the combination optical system 5 but a line pattern 17 being integrated directly into the beam splitter prism—for example by means of laser engraving.

According to a further development of the invention, the laser engraving forming the line pattern 17 is provided in a plane which is parallel to and is close as possible to the boundary line between the coated and the uncoated region, in particular the plane of the line pattern comprising the boundary line—which separates the first zone of the combination optical system from the second zone.

Since the plane of the line pattern is focused by the eye of a user, in the case of the described arrangement of the line pattern close to the boundary line the focusing plane is also present close to this boundary line between first and second zone, with the result that a sharp image of the boundary line or a sharply displayed separation between day vision display region and pure display region is produced in the combined overall image. This permits a clear and distinct display of the overall image and simplified recognition of the information displayable in the display region for a user.

In a day vision mode, i.e. during the day and with the day vision channel opened, a day vision image can now be provided in the day vision display region. If required, superposition information can additionally be displayed by means of the display—in the first part of the display which is provided for superposition. In the exclusive display region, on the other hand, only a display image produced by the second part of the display—in particular test information—is displayed.

In a night vision mode, i.e. during the night and/or with the day vision channel closed, the indication provided for the user is produced completely by the display, different indication options being available. For example, a map or an infrared image can be shown by the first part of the display and text information can be provided by the second part, which is shown in the exclusive display region. Alternatively, the cohesive display image can also be produced over the total indication region of the observation device by the display, for which—as a result of the coating present in part—an intensity adaptation of the part-images produced by the first and second part of the display can however advantageously be effected. The cohesive display image produced in this manner—by means of which, for example, a thermal image or a stored photo is displayed—can of course in turn have electronically superposed text information.

Figure 6:
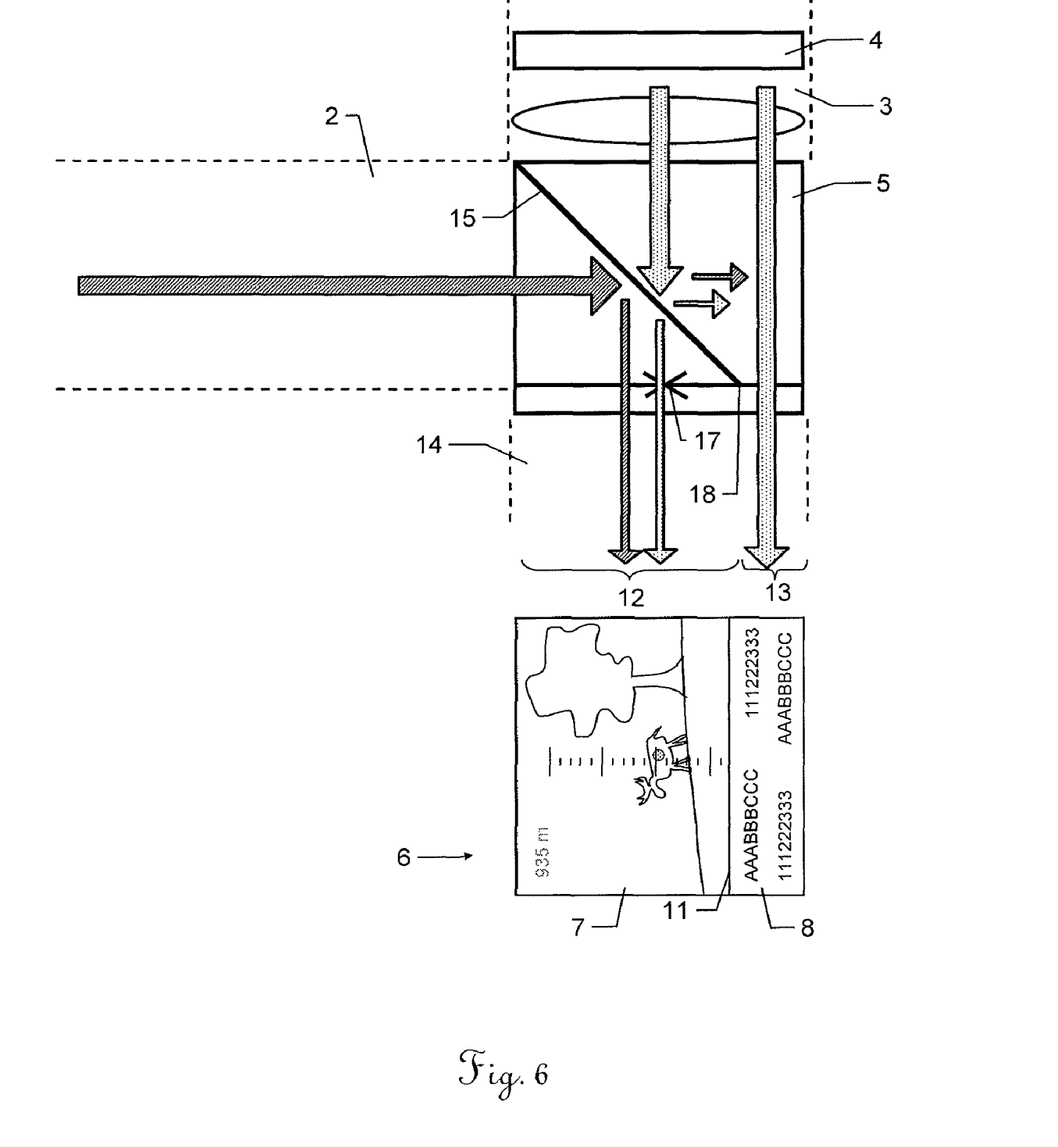
FIG. 6 shows a further embodiment according to the invention of the combination optical system with the combined overall image producible thereby.

FIG. 6 shows an alternative embodiment of the combination optical system 5, which is now formed by a special beam splitter prism. The beam splitter prism is formed in such a way and arranged in such a way between day vision channel and information channel 2, 3 that the first zone 12—having a beam splitter surface with partly transparent coating 15—extends over the total cross-section of the day vision channel 2 but only over a part of the cross-section of the information channel 3. On the other hand, the second zone 13 has no splitter surface and, in a wavelength range relevant for the information channel radiation, is formed so as to be completely transmittive and extends over the remaining part of the information channel cross-section.

Once again, the division, according to the invention, of the combined overall image 6, produced by the combination optical 5, into day vision display region 7 (or superposition region) and pure display region 8 can be produced thereby.

By means of an arrangement of the reticule plate 17 directly downstream of the prism, it is once again possible to achieve the effect according to the invention, already described with reference to FIG. 5, whereby the boundary edge 18 between first and second zone 12, 13 is arranged in the same focusing plane as the reticule plate 17, with the result that sharp imaging of the boundary 11 or separation of the two image regions 7, 8 according to the invention in the overall image 6 is once again realized.

Figure 7:
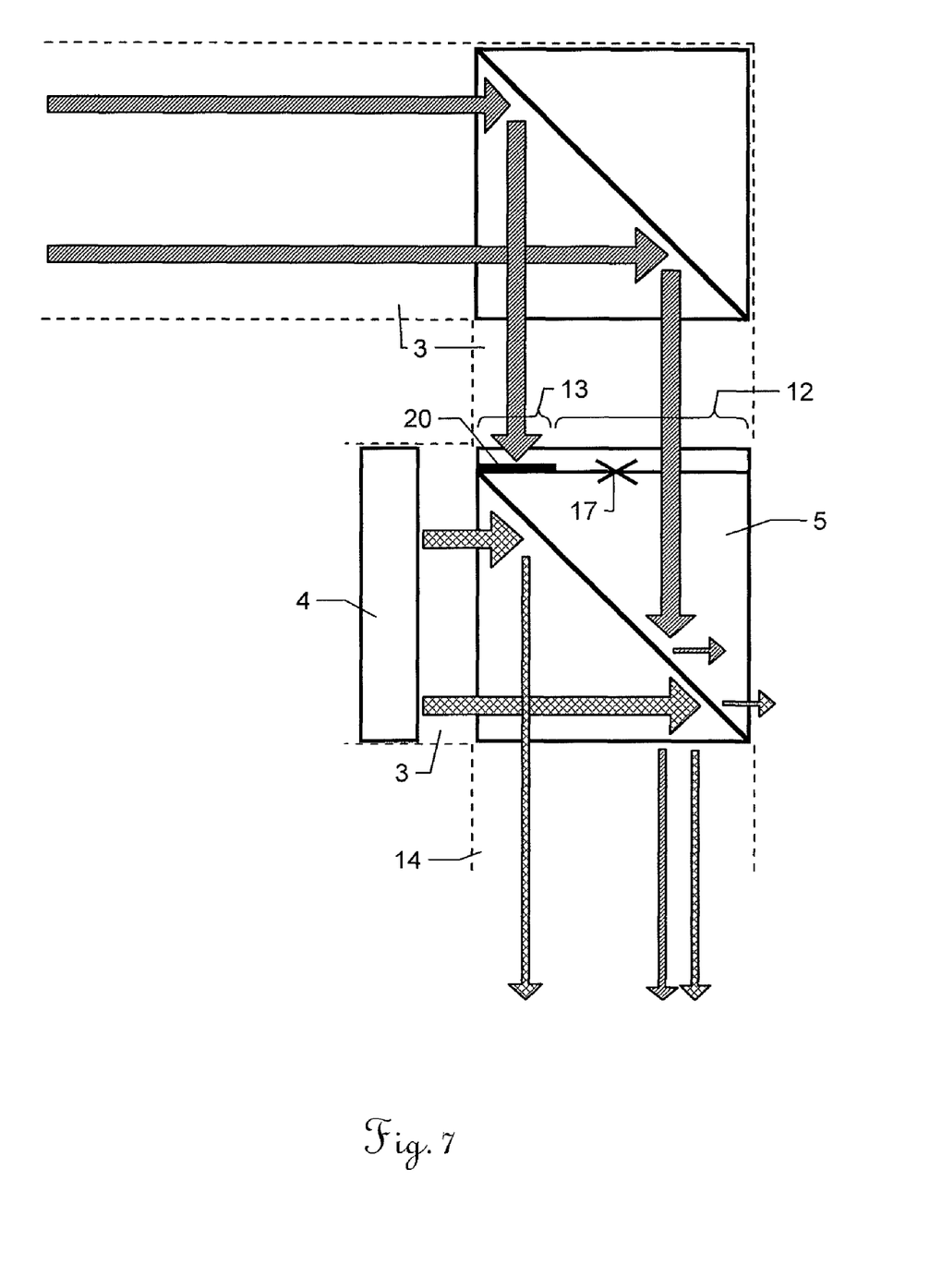
FIG. 7 shows a further embodiment according to the invention of the combination optical system with upstream reticule plate.

FIG. 7 shows a further embodiment according to the invention of the combination optical system 5 with upstream reticule plate 17 having, for example, an etched line pattern, the combination optical system having an opaque region 20 in the plane of the reticule plate for producing the pure display region, so that exclusively a part of the display image is shown in the display region of the combined overall image and no superposition with day vision image takes place.

For example, the reticule plate 17 or the beam splitter prism representing the combination optical system 5 can for this purpose have a coating 20 which is opaque to light and provides the second zone. Since in this embodiment of the combination optical system 5, too, the reticule plate 17 is once again arranged in a plane which contains the boundary line between first and second zone of the combination optical system 5, an exclusive display region sharply separated from the day vision display region is once again provided in the combined overall image.

Figure 8:
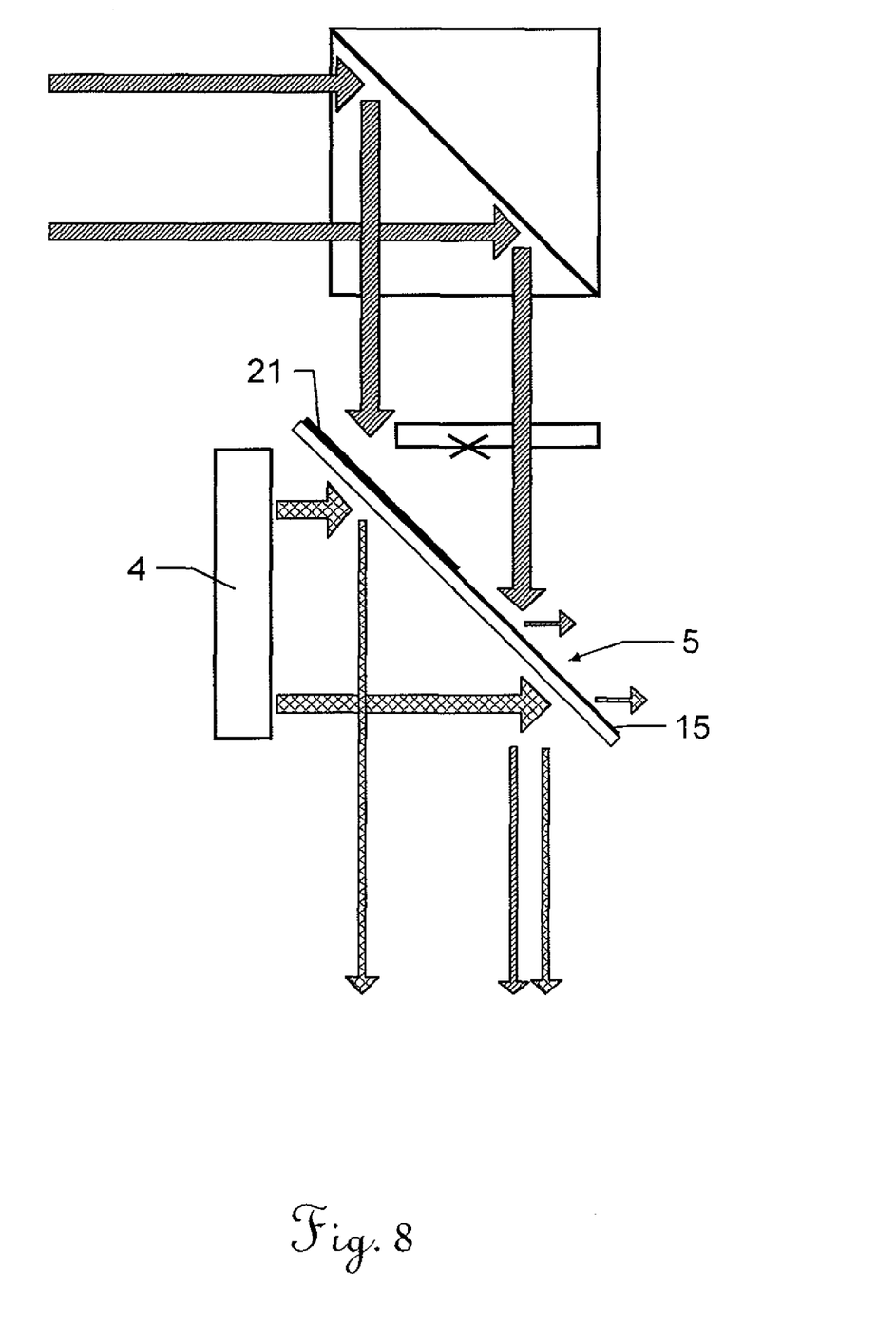
FIG. 8 shows a further embodiment according to the invention of the combination optical system with a partly transparent and/or partly reflective coating on a first part-region and a totally reflective coating on a second part-region.

FIG. 8 shows a further alternative embodiment comprising, as combination optical system 15, a beam splitter surface having two differently coated part-regions. A first part-region has a partly transparent or partly reflective coating 15. The day vision display region in the overall image is produced by this region of the combination optical system. The second part-region on the other hand has a coating 21 which, for example, is reflective, so that display image information beams are guided completely into the indication channel and the pure display region is thus produced in the overall image. Beams incident from the day vision channel on this region having a reflective coating are on the other hand deflected away so that, according to the invention, exclusively a part of the image of the display 4 is shown in the pure display region of the overall image and a superposition with a generally relatively bright day vision image is prevented. As a result, clear and distinct recognizability of the information to be provided can be ensured in the pure display region of the overall image.

Figure 9:
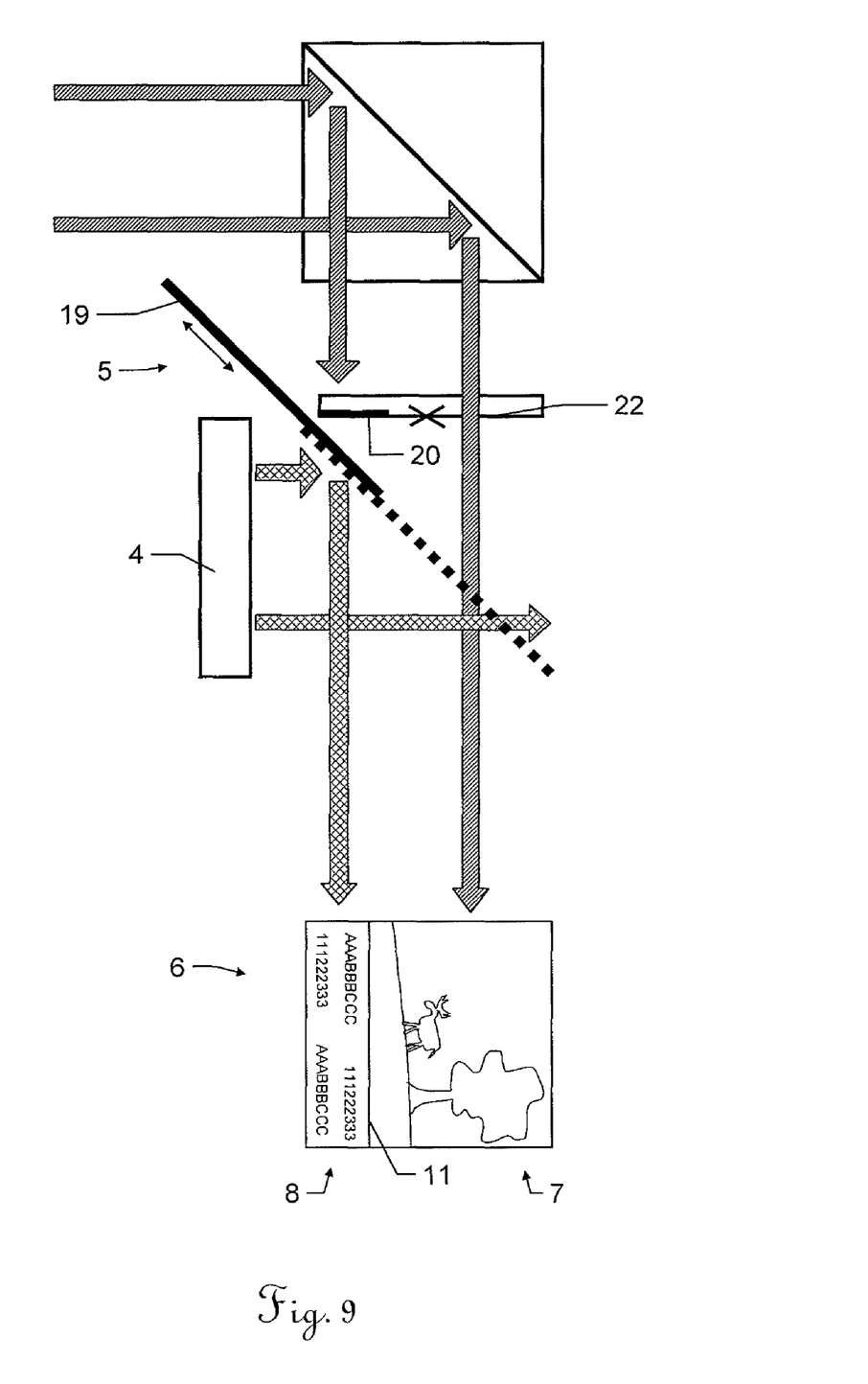
FIG. 9 shows a further embodiment with displaceable combination optical system.

FIG. 9 shows a further embodiment with displaceable combination optical system 5.

The combination optical system 5 is arranged so as to be displaceable between day vision channel and information channel in such a way that in a first position of the combination optical system 5—represented by a dashed line—exclusively a display image is provided in the total indication region (i.e. in both part-regions of the combined overall image 6). Electronically, the cohesive display image produced by the display can nevertheless be divided into two parts (for example into a night vision image region and an information region). In a second position of the combination optical system 5, on the other hand, exclusively the day vision image is shown in the day vision display region of the combined overall image 6 and exclusively a part of the display image is shown in the pure display region.

As a result, a division, according to the invention, of the overall image 6 is now possible, in which either the day vision image or a first part of the display image—alternatively selectable—is provided in the day vision display region 7. In the exclusive display region 8, a second part of the display image produced by the display 4 is always shown.

For example, the combination optical system 5 is formed for this purpose as a totally reflective element 19, in particular as a mirror, the reflective element 19 covering the total cross-section of day vision and information channel in the first position—shown as a dashed line—and covering only a proportion of the cross-section of the day vision channel and of the information channel in the second position.

In addition, an opaque coating 20 can be provided in the plane 22 of the reticule plate, the coating 20 covering a slightly higher proportion of the channel cross-section than the reflective element 19 in its second position. This means that this opaque coating 20 extends at least over the reflective element 19 in its second position, with the result that once again a sharp boundary 11 forms in the overall image 6 between the day vision image and the display image when the plane 22 of the reticule plate is focused—for example by the eye of a user.

Of course, these figures shown represent schematically only possible working examples. The various approaches can, according to the invention, be combined with one another and with methods or functions of observation devices of the generic type of the prior art—such as, for example, night vision function, laser rangefinder, electronic compass, etc. In the figures shown, the representation of further generically present components—such as, for example, further beam-shaping or beam-deflecting optical systems in day vision, display and indication channel—is substantially dispensed with for reasons of clearer representation and for better understanding.

The invention claimed is:
1. An observation device comprising at least
a day vision channel;

an information channel having a graphic electronic display for producing a display image; and a combination optical system for combining the day vision channel and the information channel to form overall image, wherein the combination optical system is configured to provide that the overall image is divided into a day vision display region configured to selectively display at least one of:
- a day vision image from the day vision channel;
- a first part of the display image, or
- a superimposition of at least a part of the day vision image with the first part of the display image;

and an exclusive display region in which only a second part of the display image is provided.

2. The observation device of claim 1, wherein the combination optical system is configured to produce the overall image with a sharp boundary between the day vision display region and the exclusive display region.

3. The observation device as claimed in claim 1, wherein the information channel has only the single graphic electronic display configured to provide:

both the first part of the display image, for superimposition with the day vision image, and a second part of the display image, wherein the second part is provided for a display that is not superimposed.

4. The observation device of claim 1, wherein the observation device is in the form of hand-held binoculars.

5. The observation device of claim 1, wherein the combination optical system is arranged displaceably between day vision channel and information channel and is configured such that:

in a first position of the combination optical system, only the display image is shown both in the day vision display region and in the exclusive display region, and in a second position of the combination optical system, exclusively the day vision image is shown in the day vision display region and exclusively a second part of the display image is shown in the exclusive display region.

6. The observation device of claim 5, wherein the combination optical system is a reflective element, and is arranged displaceably between the day vision channel and the information channel, the reflective element covering only the proportion of the cross-section of the day vision channel and of the information channel in the second position and covering the total cross-section of the day vision and the information channel in the first position.

7. The observation device of claim 1, wherein the combination optical system has a first and a second zone, the day vision display region being produced by the first zone and the exclusive display region being produced by the second zone.

8. The observation device of claim 7, wherein the first zone of the combination optical system has a partly transparent surface with a transmission and reflection ratio selected such that radiation incident on the first zone from the day vision channel and from the information channel is guided into a combined indication channel.

9. The observation device of claim 7, wherein the second zone of the combination optical system guides beams incident from the information channel into the indication channel, wherein the second zone is transmittive or totally reflective.

10. The observation device as of claim 7, wherein beams incident on the second zone from the day vision channel are prevented from entering the indication channel.

11. The observation device of claim 7, wherein the combination optical system has a beam splitter surface over the total beam cross-section of the day vision and information channel, a first part-region of the beam splitter surface configured as the first zone having a partly transparent coating so that radiation incident in this region both from the day vision channel and from the information channel is partly guided into the indication channel; and a second part-region of the beam splitter surface configured as the second zone and not being coated, so that beams incident from the information channel are guided with limited deflection into the indication channel and beams incident from the day vision channel bypass the indication channel.

12. The observation device of claim 7, wherein the first zone of the combination optical system with a beam splitter surface having a partly transparent coating that extends over the total cross-section of the day vision channel but only over a part of the cross-section of the information channel.

13. The observation device of claim 7, wherein the combination optical system has a line pattern in a beam cross-sectional plane which contains a boundary edge separating the two zones, or is parallel to the boundary edge in the relatively immediate vicinity, so that, on focusing of the line pattern, a substantially sharp image of the boundary edge is produced in the overall image.

* * * * *